United States Patent
Leppla

(10) Patent No.: US 9,175,729 B2
(45) Date of Patent: Nov. 3, 2015

(54) METHOD FOR PRODUCING A BEARING ASSEMBLY AND FITTING FOR A VEHICLE SEAT HAVING A BEARING ASSEMBLY PRODUCED ACCORDING TO SAID METHOD

(75) Inventor: Michael Leppla, Heiligenmoschel (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 94 days.

(21) Appl. No.: 14/234,713

(22) PCT Filed: Jul. 2, 2012

(86) PCT No.: PCT/EP2012/062811
§ 371 (c)(1),
(2), (4) Date: Mar. 12, 2014

(87) PCT Pub. No.: WO2013/013935
PCT Pub. Date: Jan. 31, 2013

(65) Prior Publication Data
US 2014/0301682 A1    Oct. 9, 2014

(30) Foreign Application Priority Data
Jul. 26, 2011   (DE) .......................... 10 2011 108 976

(51) Int. Cl.
*B60N 2/02*    (2006.01)
*F16C 43/02*   (2006.01)
(Continued)

(52) U.S. Cl.
CPC ................ *F16C 43/02* (2013.01); *B21D 53/10* (2013.01); *B21K 23/00* (2013.01); *B21K 25/00* (2013.01);
(Continued)

(58) Field of Classification Search
CPC ......... F16C 17/12; F16C 43/02; B21K 23/00; B21K 25/00; B21D 53/10; B60N 2/682; B60N 2/235; B60N 2/2356; B60N 2205/20
See application file for complete search history.

(56) References Cited

U.S. PATENT DOCUMENTS 7,316,211 B2 *   1/2008   Klindworth ................ 123/90.17
7,563,049 B2 *   7/2009   Peters ............................. 403/97
(Continued)

FOREIGN PATENT DOCUMENTS

DE    102 53 054 A1    6/2004
DE    103 29 237 A1    1/2005
(Continued)

OTHER PUBLICATIONS

Korean Office Action Dated Mar. 16, 2015.

*Primary Examiner* — Philip Gabler
(74) *Attorney, Agent, or Firm* — McGlew and Tuttle, P.C.

(57) ABSTRACT

A method for producing a bearing assembly for a vehicle seat, which has a first bearing element (12) and a second bearing element (16) which can be moved in a movement direction (r) relative thereto, wherein the first bearing element first receives the second bearing element, with a large, undefined play in a play direction (p) which is perpendicular to the movement direction, and the first bearing element and/or the second bearing element is later deformed in a plastic manner by pressurizing in a stamping direction (x) until the first bearing element and the second bearing element contact each other without play in the play direction. Before the plastic deformation, the first bearing element elastically deforms under reduction of play and the elastic deformation is reversed after the plastic deformation, so that a defined clearance fit occurs between the first bearing element and the second bearing element.

10 Claims, 6 Drawing Sheets

(51) Int. Cl.
  *B21K 23/00* (2006.01)
  *B21K 25/00* (2006.01)
  *B21D 53/10* (2006.01)
  *B60N 2/68* (2006.01)
  *B60N 2/235* (2006.01)
  *F16C 17/12* (2006.01)

(52) U.S. Cl.
  CPC .............. *B60N 2/2356* (2013.01); *B60N 2/682* (2013.01); *F16C 17/12* (2013.01); *B60N 2205/20* (2013.01); *Y10T 29/49647* (2015.01)

(56) References Cited

U.S. PATENT DOCUMENTS 7,815,375 B2 * 10/2010 Kroner .......................... 384/295
2006/0171621 A1   8/2006 Kroner
2009/0066137 A1 * 3/2009 Ishihara et al. ............... 297/366
2011/0062760 A1 * 3/2011 Zellmann et al. ......... 297/367 R
2011/0169314 A1 * 7/2011 Tanguy et al. ............ 297/367 P
2012/0169105 A1   7/2012 Assmann et al.

FOREIGN PATENT DOCUMENTS

| | | |
|---|---|---|
| DE | 10 2005 046 807 B3 | 11/2006 |
| DE | 10 2006 015 560 B3 | 8/2007 |
| DE | 20 2009 016 989 U1 | 4/2010 |
| DE | 20 2010 015 171 U1 | 2/2011 |
| FR | 2 848 927 A1 | 6/2004 |
| JP | 2000-153 327 A | 6/2000 |
| JP | 2000 153327 A | 6/2000 |
| JP | 2004 147811 A | 5/2004 |
| WO | 2009/111880 A1 | 9/2009 |

* cited by examiner

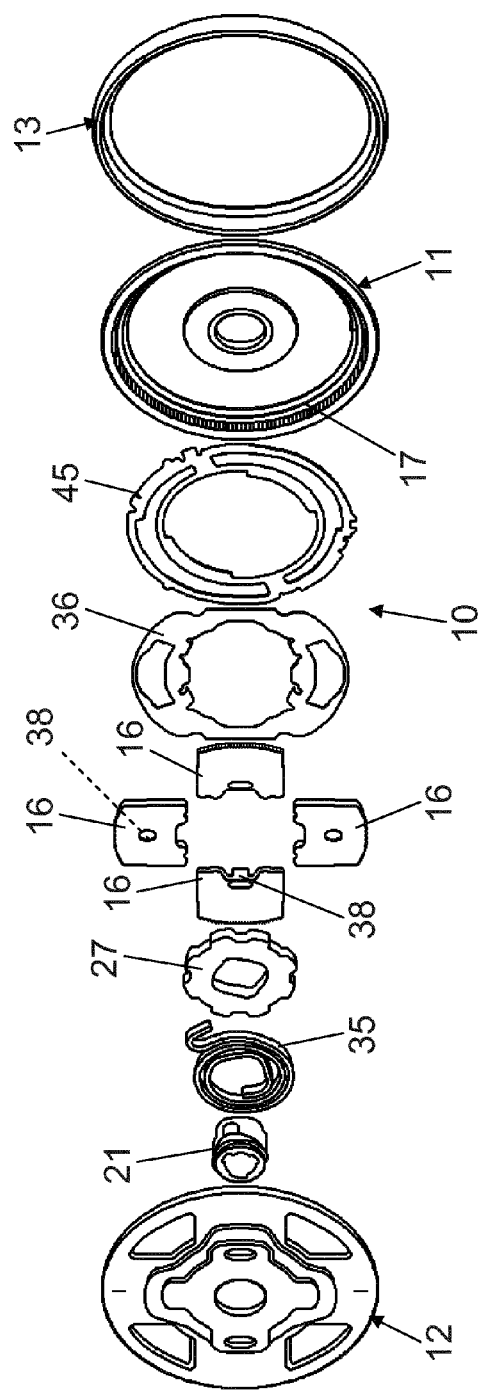
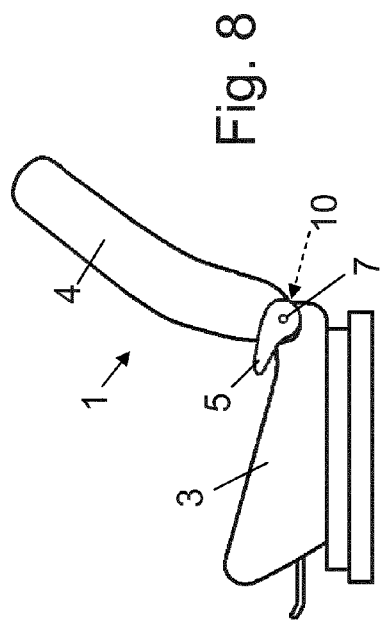
Fig. 5
Fig. 8

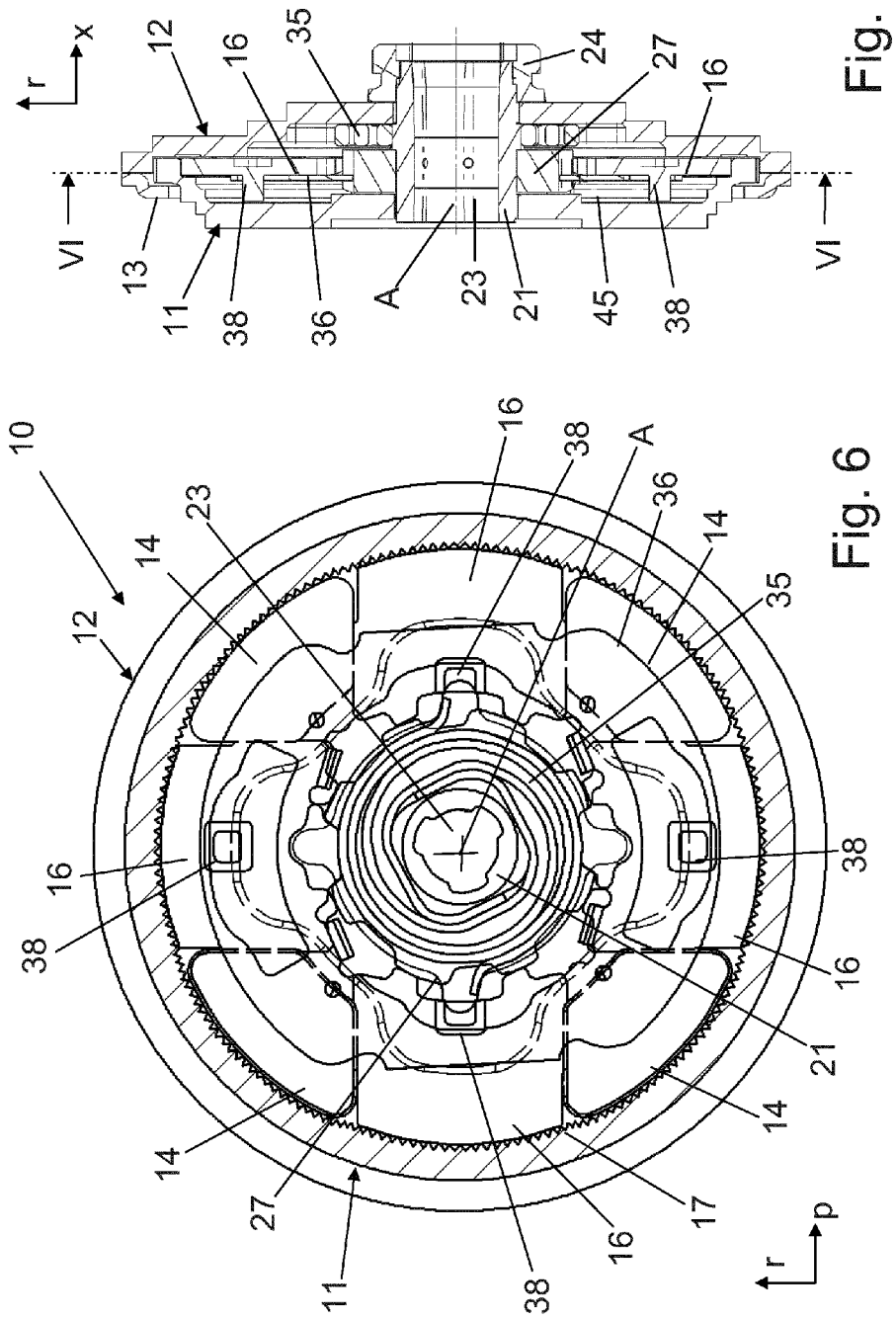

METHOD FOR PRODUCING A BEARING ASSEMBLY AND FITTING FOR A VEHICLE SEAT HAVING A BEARING ASSEMBLY PRODUCED ACCORDING TO SAID METHOD

CROSS REFERENCE TO RELATED APPLICATIONS

This application is a United States National Phase Application of International Application PCT/EP2012/062811 filed Jul. 2, 2012 and claims the benefit of priority under 35 U.S.C. §119 of German Patent Application DE 10 2011 108 976.8 filed Jul. 26, 2011, the entire contents of which are incorporated herein by reference.

FIELD OF THE INVENTION

The invention relates to a method for producing a bearing assembly for a vehicle, in particular for a vehicle seat, the bearing assembly having bearing elements which are movable relative to each other in a direction of movement.

BACKGROUND OF THE INVENTION

Producing interference fits, for example in bearing assemblies, is costly as low manufacturing tolerances have to be maintained. Thus, often only complex manufacturing methods are used or a classification and sorting into tolerance groups has to be carried out, which is associated with high logistics and manufacturing costs. If the tolerance groups are not able to be specifically produced, sorting is not always possible so that surplus parts are produced which have to be scrapped. A method for producing a bearing assembly or a further sub-assembly with an interference fit, in which the individual components may be produced with high tolerances and which comprises a step in which the high tolerances are all compensated is desirable.

A bearing assembly which is produced according to a method of the type mentioned in the introduction is disclosed in DE 103 29 237 A1. According to said method, the first bearing element is provided with an opening which is surrounded by a plurality of material recesses. Deformation regions are located between the material recesses and the opening. The second bearing element is configured as a pin, the direction of movement thereof extending in the peripheral direction. The first bearing element receives via its opening the second bearing element. A high degree of clearance is initially present in the direction of clearance defined by the radial direction. Then the deformation regions are plastically deformed so that projections are formed in the direction of clearance, until said projections bear against the second bearing element entirely without clearance. Due to the absence of clearance, however, there is the risk that the two bearing elements jam together.

DE 20 2010 015 171 U1 discloses a bearing assembly in which on the first bearing element the projections are initially produced on the opening and then the second bearing element is inserted by elastic deformation of the projections into the opening of the first bearing element. Depending on the extent of the elastic deformation, there may be the risk that a certain lack of freedom of movement results.

SUMMARY OF THE INVENTION

The object of the invention is to improve a method of the type mentioned in the introduction for producing a bearing assembly and to provide a fitting having a bearing assembly produced according to said method.

According to the invention, a method is provided for producing a bearing assembly for a vehicle, in particular for a vehicle seat. The bearing assembly has a first bearing element and a second bearing element which is movable relative thereto, in a direction of movement. The method comprises the steps of receiving initially, by the first bearing element, the second bearing element with a large, undefined clearance (a clearance larger than a final defined clearance) in a direction of clearance which is perpendicular to the direction of movement. Subsequent to the step of receiving, one of the first bearing element and the second bearing element is plastically deformed by the one of the first bearing element and the second bearing element being acted upon in a stamping direction, until the first bearing element and the second bearing element bear against one another without clearance in the direction of clearance. After the step of receiving, and before the step of plastically deforming, the first bearing element is elastically deformed with the reduction of clearance. After the plastic deformation the elastic deformation is reversed so that a defined clearance fit is produced between the first bearing element and the second bearing element.

According to another aspect of the invention, a fitting is provided for a vehicle seat, in particular for a motor vehicle seat. The fitting comprises a first fitting part and a second fitting part, which may be locked together by means of at least one locking bar and which are able to be rotated relative to one another about an axis. The fitting includes a bearing assembly with a first bearing element and a second bearing element, the bearing assembly being produced by the method steps according to the invention as described above. The bearing assembly has the two fitting parts as the first bearing element and the second bearing element and/or the second fitting part as the first bearing element and the at least one locking bar as the second bearing element.

The elastic deformation of the first bearing element temporarily alters the geometry of the first bearing element for receiving the second bearing element. If, with the temporarily altered geometry, the clearance of the bearing assembly is now eliminated by means of the plastic deformation, i.e. the bearing elements bear against one another without clearance, accordingly the temporary alteration to the geometry may be made reversible, i.e. the elastic deformation may be reversed in order to produce a defined clearance fit of the bearing assembly. The extent of the clearance of this clearance fit, preferably 0.02 to 0.10 mm, depends on the degree of elastic deformation and may be selected to be minimal (and different from zero). With an elastic deformation due to flexing of 0.5 mm, for example a clearance of 0.05 mm may be produced. The different (production) tolerances of the bearing elements are compensated by the plastic deformation so that the minimal defined clearance is (substantially) independent of the original tolerances of the bearing elements.

The classification and sorting into tolerance groups are dispensed with. Costly manufacturing methods are dispensed with. As a result, the production is more cost-effective overall.

The elastic deformation is preferably achieved by an uneven support, in particular a concave or convex support, on which the first bearing element initially comes to bear at intervals and/or in a linear manner and subsequently—for example by means of a stamp or a different type of impingement—is brought to bear flat against the support, i.e. due to a corresponding flexing of the first bearing element. If the impingement is discontinued, the first bearing element springs back into its original shape—apart from the plastic deformation.

The plastic deformation takes place, for example by means of caulking, preferably along the bearing surfaces of the bearing elements, for example by material being displaced at displacement points by means of a stamp, and resulting in the formation of projections. The second bearing element then bears against the projections of the first bearing element (or vice versa).

The bearing assembly produced by means of the method according to the invention may, for example, be an (integral) component of a fitting as is used in vehicle seats, for example in order to bring the backrest into positions of use which have different inclinations or to pivot the backrest into positions of non-use. The bearing assembly may relate to the fitting parts which are able to be rotated relative to one another or the locking bars and the fitting part guiding the locking bars. Apart from on the backrest such a fitting may also be used at different points of the vehicle seat, and the bearing assembly may be used at different points of the vehicle seat or even of the vehicle. By means of the method according to the invention, a further interference fit may also be produced with a defined clearance.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is an exploded view of a fitting according to the invention;

FIG. 6 is a radial sectional view through the fitting along the line VI-VI in FIG. 7;

FIG. 7 is an axial sectional view through the fitting; and

FIG. 8 is a schematic view of a vehicle seat.

DESCRIPTION OF THE PREFERRED EMBODIMENTS

Figure 1:
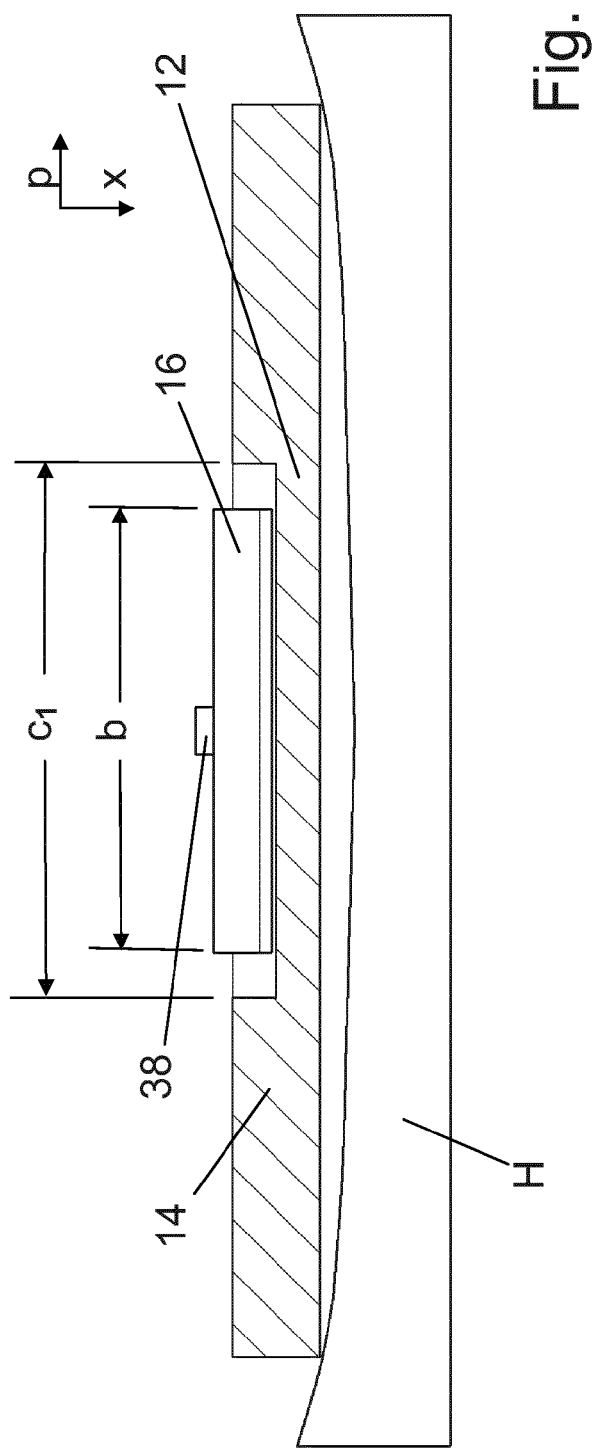
FIG. 1 is a schematic sectional view through a bearing assembly before the elastic deformation.
Figure 2:
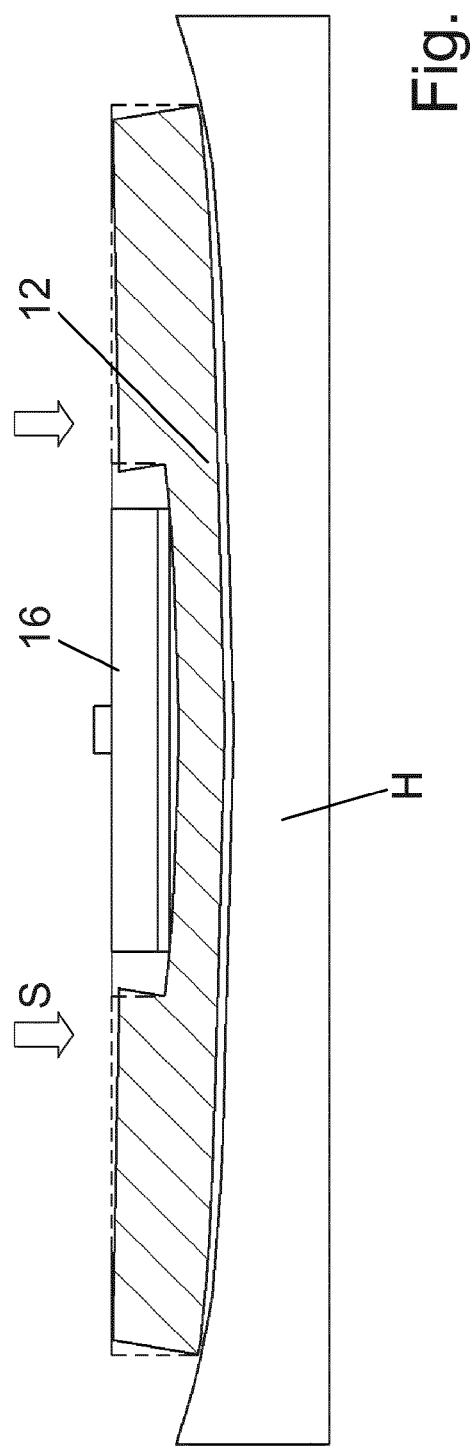
FIG. 2 is a view corresponding to FIG. 1, showing the bearing assembly during the elastic deformation.
Figure 3:
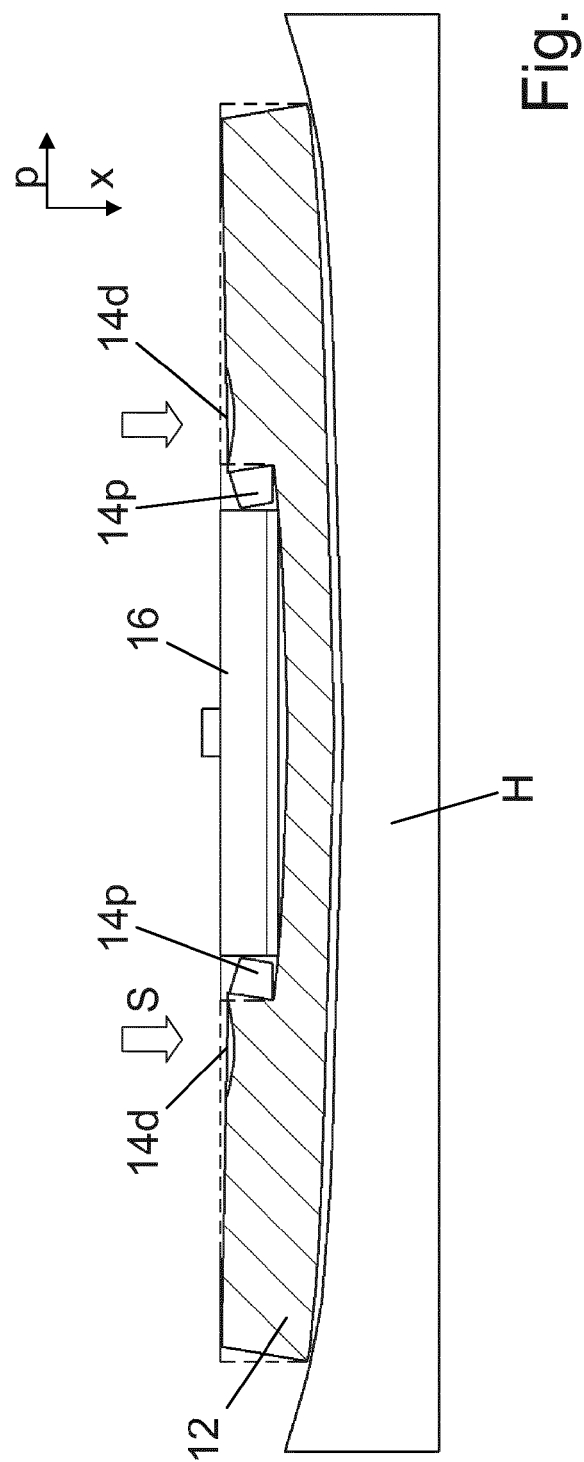
FIG. 3 is a view corresponding to FIGS. 1 and 2, showing the bearing assembly during the plastic deformation.
Figure 4:
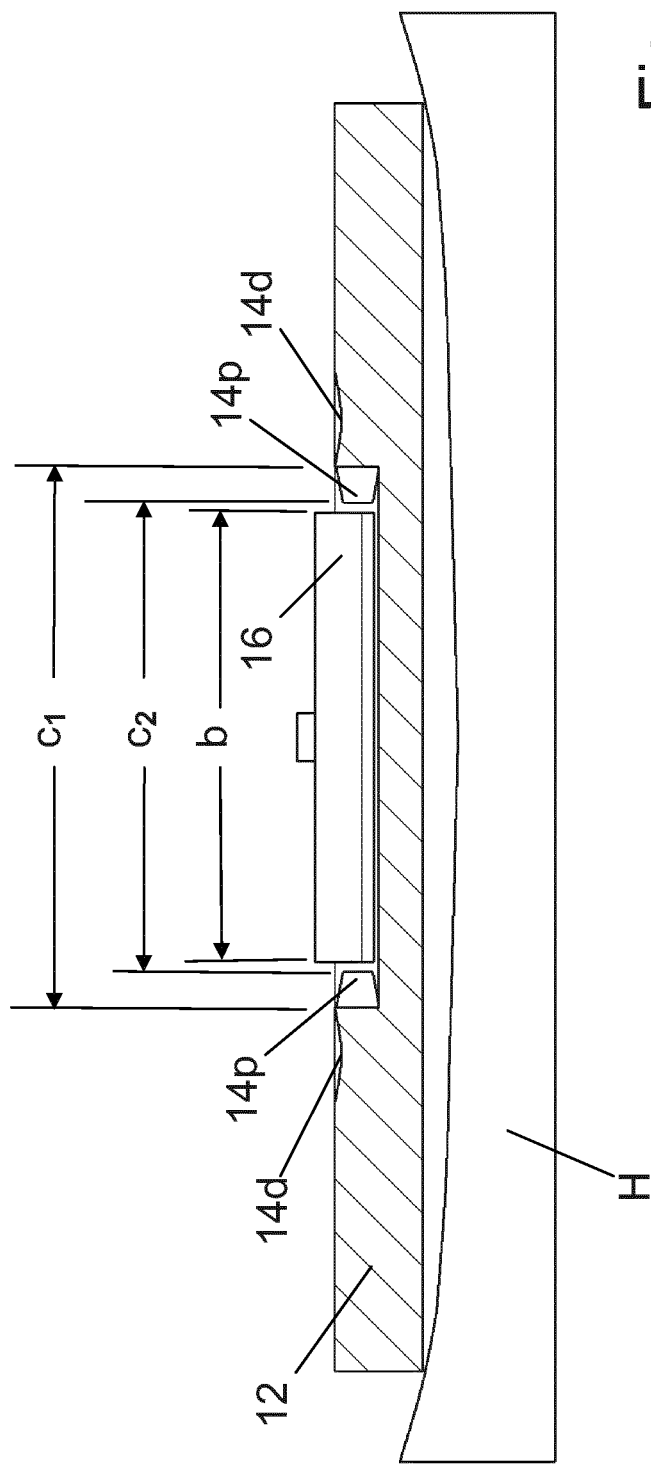
FIG. 4 is a view corresponding to FIGS. 1 to 3, showing the bearing assembly after the reversal of the elastic deformation.

Referring to the drawings in particular, a vehicle seat 1 for a motor vehicle has a seat part 3 and a backrest 4 which is able to be adjusted in the inclination thereof relative to the seat part 3. For adjusting the inclination of the backrest 4, a transmission rod 7 is rotated manually, for example by means of a hand lever 5, said transmission rod being arranged horizontally in the transition region between the seat part 3 and the backrest 4. On both sides of the vehicle seat 1 the transmission rod 7 engages in a fitting 10 with a connection which is fixed in terms of rotation (or coupled for entrainment with defined free travel).

The fitting 10 has a first fitting part 11 and a second fitting part 12 which are able to be rotated relative to one another about an axis A. The (imaginary) axis A in the present case is aligned with the transmission rod 7 and defines the directional information of a cylinder coordinate system used. The two fitting parts 11 and 12 may in each case be approximately inscribed in a circular disk shape. Both fitting parts 11 and 12 preferably consist of metal, in particular steel, which may be hardened at least in regions. A clasping ring 13 is provided for absorbing the axially acting forces i.e. for axially retaining the fitting parts 11 and 12 together. The clasping ring 13 preferably consists of metal, in particular steel, which is preferably unhardened. The clasping ring 13 preferably has a substantially planar annular shape but in an alternative embodiment may be profiled in an L-shape with a cylinder portion and on the front face with a planar annular portion.

The clasping ring 13 is fixedly connected to one of the two fitting parts 11 and 12, in the present case in an outer annular portion to the second fitting part 12, for example, by means of laser welding or by means of a further fastening technique known per se. By means of an internal annular portion, which is arranged in a plane perpendicular to the axial direction, the clasping ring 13 encompasses the first fitting part 11 optionally by the interposition of a sliding ring, in the radial outer edge region thereof, without hindering the relative movement of the two fitting parts 11 and 12. Additionally, the inner surfaces of the two fitting parts 11 and 12 facing one another are protected from the penetration of foreign bodies and soiling and damage.

The clasping ring 13 and the fitting part 11 or 12 fixedly connected thereto thus clamp the other of the two fitting parts 11 and 12 which is movable relative thereto. In terms of construction, therefore, the two fitting parts 11 and 12 (with the clasping ring 13) together form a disk-shaped unit.

When mounting the fitting 10, the first fitting part 11 is, for example, fixedly connected to the structure of the backrest 4, i.e. fixed to the backrest. The second fitting part 12 is thus fixedly connected to the structure of the seat part 3, i.e. fixed to the seat part. The assignments of the fitting parts 11 and 12, however, may also be exchanged, i.e. the first fitting part 11 would then be fixed to the seat part and the second fitting part 12 would be fixed to the backrest. The fitting 10 is located in the flux of force between the backrest 4 and the seat part 3.

The fitting 10 is configured as a latching fitting in which the first fitting part 11 and the second fitting part 12 are able to be locked together, as disclosed for example in DE 20 2009 016 989 U1, the relevant disclosure thereof being expressly incorporated in the invention.

The second fitting part 12 has—in the present case four—guide segments 14 which with straight guide surfaces in each case guide a locking bar 16 in pairs laterally in the radial direction. The locking bars 16—in the present case four—are arranged offset to one another—in the present case respectively by 90°—in an installation space defined between the two fitting parts 11 and 12. The locking bars 16 are provided at their radial external end with a toothing which may come (fall) into engagement with a toothed ring 17 of the first fitting part 11 configured as a ring gear. If the toothed ring 17 and the locking bars 16 cooperate, the fitting 10 is locked.

The first fitting part 11 is arranged in a recess of the second fitting part 12 and is radially outwardly encompassed thereby, whereby the two fitting parts 11 and 12 bear against one another. In this case, the radial outer edge region of the first fitting part 11 is arranged with the toothed ring 17 in the radial direction between the guide segments 14 and the radial outer edge region (serving for bearing against the first fitting part 11) of the second fitting part 12. In the case of high loads, for example in the event of a crash, the first fitting part 11—after a deformation—may come to bear with its toothed wheel 17 against the guide segments 14 located closer in the loading direction, said guide segments having correspondingly (concentrically) curved surfaces in the direction toward the toothed ring 17. This increases the strength of the fitting 10.

The first fitting part 11 may be mounted in the second fitting part 12. The relationships, however, could be exactly reversed, i.e. the second fitting part 12 may be mounted on the first fitting part 11. In principle, however, both arrangements are equivalent.

A drive element 21, for example made of plastics material, is arranged in the center of the fitting 10, said drive element being rotatably mounted on at least one of the two fitting parts 11 and 12, in the present case the first fitting part 11, more specifically in a central opening thereof. On both vehicle seat sides, the drive element 21 is connected fixedly in terms of rotation or at least coupled for entrainment with the transmission rod 7 which is inserted into a bore 23 of the hollow drive element 21. At one end of the drive element 21, in the present case the end on the second fitting part 12, a fastening ring 24 is provided, said fastening ring in the present case consisting of plastics material and being preferably fastened by means of ultrasonic welding to the drive element 21. The hand lever 5 may be securely clipped to the fastening ring 24, fixedly in terms of rotation.

An eccentric 27 is located fixedly in terms of rotation or at least coupled for entrainment on the drive element 21, said eccentric being arranged in the installation space defined between the fitting parts 11 and 12. A spring arrangement 35, for example one or two spiral springs nested together, is arranged in a central receiver of one of the two fitting parts 11 and 12, in the present case of the second fitting part 12 and in the present case outwardly supported. The spring arrangement 35 acts on the eccentric 27, in the present case by being located fixedly in terms of rotation on the inside on the drive element 21. Such a spring arrangement 35 is disclosed, for example, in DE 20 2009 016 989 U1 already cited above or is disclosed in DE 10 2005 046 807 B3, the relevant disclosure thereof being expressly incorporated in the invention. The eccentric 27 acted upon by the spring arrangement 35 acts on the radially movable locking bars 16 and impinges upon said locking bars so that they are forced radially outwardly, in order to engage in the toothed ring 17, whereby the fitting 10 is locked.

A control disk 36 is arranged axially in the installation space between the locking bars 16 and the first fitting part 11 and in the present case is located fixedly in terms of rotation on the eccentric 27. The control disk 36 has—in the present case four—control tracks which in each case cooperate with a lug 38 of each locking bar 16. The lugs 38 in this case protrude in the axial direction from the locking bars 16 assigned thereto. With a rotation (by a few degrees) of the drive element 21—and the eccentric 27 driven thereby and the control disk 36—counter to the force of the spring arrangement 35, the control disk 36 pulls the locking bars 16 radially inwards, i.e. out of the toothed ring 17, whereby the fitting 10 is unlocked and the two fitting parts 11 and 12 are able to be rotated relative to one another about the axis A. The backrest 4 is now pivotable about the axis A in order to adjust the inclination thereof, i.e. to adopt a different position of use.

In two-door motor vehicles, the access to a rear seat row is intended to be facilitated by freely pivoting the backrest 4, for which the unlocked backrest 4 is pivoted to the front from one of the positions of use into a freely-pivoted position which is not suitable for seating use. It increases the user comfort if the hand lever 5—or a further actuating element—does not have to be held during the entire free-pivoting movement and in any case the fittings are only locked in the freely-pivoted position. To this end, an annular freely-pivoting control element 45 is optionally provided in the fitting 10 between the control disk 36 and the first fitting part 11 about the axis A, as disclosed, for example, in DE 10 2006 015 560 B3, the relevant disclosure thereof being expressly incorporated in the invention.

The second fitting part 12 and the locking bars 16 define a bearing assembly of the vehicle seat 1 which permits a desired movement of the locking bars 16 relative to the second fitting part 12 in the respective direction of movement r thereof. The second fitting part 12 forms with its guide segments 14 a first bearing element, the locking bars 16 in each case forming a second bearing element which is movable relative thereto.

So that the locking bars 16 are able to be moved in the desired manner and do not jam between the guide segments 14, a defined clearance fit is required and namely with a minimum clearance perpendicular to the direction of movement r of the locking bars 16 in a direction of clearance p. The locking bar width b is the dimension of a (or any) locking bar 16 perpendicular to the direction of movement r thereof, i.e. in the direction of clearance p. The channel receiving the locking bar 16 between two guide segments 14 is defined by the edges facing one another of said guide segments 14 guiding the locking bars 16, and has in the direction of clearance p an original channel width $c_1$ which is defined as the spacing between said edges. In order to achieve the desired defined clearance, the original channel width $c_1$ is fractionally larger than the locking bar width b and namely for all tolerances. In the prior art, this would require very accurate component tolerances or classification into tolerance groups and sorting.

According to the invention, the individual parts are produced with greater tolerances and the desired clearance fit is adjusted when assembling the fitting 10. In the present case, the second fitting part 12 is produced with the guide segments 14 so that the original channel width $c_1$ with tolerances is considerably larger than the locking bar width b with tolerances.

The second fitting part 12 is placed—with its axially outwardly facing front face—on a concave support H. With four locking bars 16, the support H may be curved in a spherical manner and, with two locking bars 16, in a cylindrical manner. The central point of curvature of the support H is located in a stamping direction x which in the present case coincides with the axial direction which is fixed relative to the second fitting part 12 and which is oriented perpendicular to the direction of movement r and to the direction of clearance p. As the second fitting part 12 has a planar front face, it only bears against the support H at intervals and/or in a linear manner, namely on the edge, whilst in the center it is spaced apart from the support H. The locking bars 16 are placed on the support H between the guide segments 14 (into the channels), before or after positioning the second fitting part 12, wherein a large undefined clearance (c-b) is present between the locking bars 16 and the guide segments 14 of the second fitting part 12.

Then a stamp S which is able to be moved in a stamping direction x is applied to the front face of the fitting part 12, facing axially inwards, more specifically onto the guide segments 14. The stamp S applied in the stamping direction x acts on the second fitting part 12 with a defined force distribution. Due to the action by the stamp S, the second fitting part 12 deforms elastically and bears flat against the support H, in other words with surface contact, i.e. the second fitting part 12 flexes elastically. The original channel width $c_1$ is reduced as the edges of the guide segments 14 approach one another. Correspondingly, the clearance is reduced between the locking bars 16 and the guide segments 14 of the second fitting part 12.

With increased force of the same stamp S (or alternatively a further stamp), the guide segments 14 are now locally deformed plastically and namely at the edges until the guide segments 14 of the second fitting part 12 and the locking bars 16 bear against one another without clearance (press fit). To this end, the stamp S acting on the second fitting part 12 in the stamping direction x, displaces the material of the guide segments 14 at least approximately in the direction of clearance p and thus perpendicular to the direction of movement r of the respective locking bars 16, i.e. in the present case tangentially to the radial direction. Preferably, the local impingement and the local plastic deformation takes place in each case at two displacement points 14d along each edge facing a locking bar 16 of each guide segment 14, i.e. in the present case at a total of sixteen displacement points 14d of the second fitting part 12. A projection 14p facing in the direction of clearance p (or in the opposing direction) is formed adjacent to each displacement point 14d, said projection bearing against the locking bar 16. The projections 14p which have been formed alter the shape of the channel and define the now effective channel width $c_2$. The effective channel width $c_2$ is reduced to the locking bar width b due to the plastic deformation. The extent of the local plastic deformation depends on the tolerances originally produced.

As soon as the stamp S is moved back again counter to the stamping direction x, i.e. the action on the second fitting part 12 is discontinued, the elastic deformation of the fitting part 12 is reversed, i.e. the second fitting part 12 is released from bearing flat against the support H, so that the front face is flat again. The plastic deformation of the guide segments 14 is maintained at the displacement points 14d and the projections 14p but the effective channel width $c_2$ is increased relative to the locking bar width b corresponding to the reversal of the elastic deformation, i.e. the projections 14p move away again from the locking bars 16, so that the defined clearance fit with a clearance of $c_2$-b is produced as desired. The extent of the increase in the effective channel width $c_2$ to the final value thereof depends on the geometry of the support H, and is substantially independent of the original production tolerances.

Alternatively (or cumulatively) to the plastic deformation of the guide segments 14 of the second fitting part 12, the locking bars 16 may also be plastically deformed.

The method according to the invention may take place individually and in succession for each locking bar 16 or at the same time for all locking bars 16 or at the same time for locking bars 16 opposing one another in pairs and in succession relative to the pairs. It is also possible that the defined clearance fit is only formed on two opposing locking bars 16, whilst the other locking bars 16 have a looser fit in order to be able to tilt in a targeted manner as disclosed, for example, in DE 102 53 054 A1. To this end, for example, only two projections 14p are formed, said projections being arranged radially inwardly or diagonally opposing one another.

The bearing assembly produced according to the invention may also be formed between the two fitting parts 11 and 12 as bearing elements, wherein the direction of movement r is then the circumferential direction. To produce this bearing assembly, the first fitting part 11 is placed on a convex support or the second fitting part 12 is placed on a concave support H and elastically deformed so that the external dimension of the first fitting part 11 is increased or the internal dimension of the recess of the second fitting part 12 provided for receiving the first fitting part 11 is reduced. The respective other fitting part 12 or 11 is positioned before or after the elastic deformation. After the elastic deformation, a plastic deformation takes place at a plurality of displacement points whereupon the projections are formed in the direction of clearance or in the opposing direction. Subsequently, the elastic deformation is reversed, whereby the defined clearance is produced.

In an alternative variant, not shown, a highly concave surface is used for stamping the guide segments 14. By the limited elasticity of the guide segments 14, said guide segments reach their initial state after shaping, in particular a flatness, but this is not due to the spring-back behavior of the material. In order to achieve a desired flatness, in particular a flatness as before the shaping process, an additional calibration process is required after the shaping process. This process step may preferably be integrated in the stamping tool.

In an alternative variant, not shown here, a filling piece is used for stamping the guide segments 14, instead of the other fitting part 12 or 11 to be used. Depending on the respective shaping, the extent of the effective channel width $c_2$ is able to be adjusted in a variable manner by means of the filling piece after the stamping process.

While specific embodiments of the invention have been shown and described in detail to illustrate the application of the principles of the invention, it will be understood that the invention may be embodied otherwise without departing from such principles.

The invention claimed is:

1. A method for producing a bearing assembly for a vehicle seat, said bearing assembly having a first bearing element and a second bearing element which is movable relative thereto in a direction of movement, the method comprising the steps of:
receiving initially, by the first bearing element, the second bearing element with a large, undefined clearance in a direction of clearance which is perpendicular to the direction of movement;
subsequent to the step of receiving, plastically deforming one of the first bearing element and the second bearing element by the one of the first bearing element and the second bearing element being acted upon in a stamping direction, until the first bearing element and the second bearing element bear against one another without clearance in the direction of clearance;
after the step of receiving and before the step of plastically deforming, elastically deforming the first bearing element with the reduction of clearance; and
reversing the elastic deformation after the plastic deformation so that a defined clearance fit is produced between the first bearing element and the second bearing element.

2. The method as claimed in claim 1, wherein, for the elastic deformation, the first bearing element is placed on a support and is acted upon by a stamp in the stamping direction, which is oriented in particular perpendicular to the direction of movement and to the direction of clearance.

3. The method as claimed in claim 2, wherein the support is curved in a concave or convex manner.

4. The method as claimed in claim 2, wherein one or more of the first bearing element placed on the support initially bears against the support at intervals, and the first bearing element placed on the support initially bears against the support in a linear manner, said first bearing element bearing flat against the support by being acted upon by the stamp.

5. The method as claimed in claim 2, wherein the stamp carries out the plastic deformation after the elastic deformation of the first bearing element.

6. The method as claimed in claim 5, wherein the stamp displaces one or more of material of the first bearing element and material of the second bearing element at displacement points, whereby adjacent to the displacement points projections are formed in the direction of clearance or in the opposing direction.

7. A fitting for a vehicle seat, the fitting comprising:
a first fitting part and a second fitting part which may be locked together by means of at least one locking bar and which are able to be rotated relative to one another about an axis
a bearing assembly including a first bearing element and a second bearing element, the bearing assembly being produced by the steps of:
receiving initially, by the first bearing element, the second bearing element with a large, undefined clearance in a direction of clearance which is perpendicular to the direction of movement;
subsequent to the step of receiving, plastically deforming one of the first bearing element and the second bearing element by the one of the first bearing element and the second bearing element being acted upon in a stamping direction, until the first bearing element and the second bearing element bear against one another without clearance in the direction of clearance;
after the step of receiving and before the step of plastically deforming, elastically deforming the first bearing element with the reduction of clearance; and
reversing the elastic deformation after the plastic deformation so that a defined clearance fit is produced between the first bearing element and the second bearing element, wherein one or more of: the bearing assembly has the two fitting parts as the first bearing element and the second bearing element; and the bearing assembly has the two fitting parts as the second fitting part as the first bearing element and the at least one locking bar as the second bearing element.

8. The fitting as claimed in claim 7, further comprising guide segments which movably guide the at least one locking bar between one another in the direction of movement, wherein an effective channel width between the guide segments and a locking bar width of the at least one locking bar is defined in the direction of clearance.

9. The fitting as claimed in claim 8, wherein the effective channel width is larger than the locking bar width by the defined clearance fit in the direction of clearance.

10. The fitting as claimed in claim 8, wherein the guide segments or the at least one locking bar comprise projections at a plurality of displacement points, said projections being formed adjacent to displacement points due to the plastic deformation and facing in the direction of clearance or in the opposing direction.

* * * * *